UNITED STATES PATENT OFFICE.

FRANCIS BASCHNAGEL, OF BEVERLY, MASSACHUSETTS, ASSIGNOR TO HIMSELF AND THE BEVERLY RUBBER COMPANY.

IMPROVEMENT IN RESTORING WASTE VULCANIZED RUBBER.

Specification forming part of Letters Patent No. 20,678, dated June 22, 1858.

*To all whom it may concern:*

Be it known that I, FRANCIS BASCHNAGEL, of Beverly, in the county of Essex and State of Massachusetts, have invented a new and useful Improvement in the Process of Restoring Waste Vulcanized or Hard India-Rubber—that is to say, such rubber which, being once cured or prepared by any of the processes described in the Letters Patent of the United States granted to Charles Goodyear, or any other process, (applied for similar purposes,) has by any reason become waste or useless, or having been manufactured into car-springs, shoes, packing, canes, and other fabrics and substances, has served its purpose or otherwise become unfit for the purposes of use, wearing, trade, or commerce— to such a soft or plastic or gummy state that it may be ground and used again in the manufacture of india-rubber substances and fabrics, of which the following is a specification.

In the series of experiments I instituted I discovered, first, that by applying to such waste vulcanized rubber heat the rubber at a certain time became elastic and sticky like new rubber, but found some difficulty in the fact that when submitted to heat the rubber became often burned and brittle or hard, and by reason of its stickiness adhered more or less to the cylinders when being ground. I succeeded in removing these difficulties by throwing the rubber, when sufficiently heated, into cold water, the sudden change from one temperature to the other producing the desired effect of preventing such burning and removing the stickiness or tendency of the pieces of rubber to adhere to each other and to the cylinders.

To enable others skilled in the art to use my invention, I will proceed to describe the particulars of my process more fully.

I first cut or divide by means known for such purpose the rubber intended to be restored for use into pieces. Then submit the same in a vessel suited to the purpose for about half an hour to an artificial heat of from 150° to 600° Fahrenheit, and upward, thereby producing a sticky substance which has reassumed the elasticity of new rubber. When the rubber appears to be sufficiently heated I throw it into a vessel containing cold water, to remain there until cooled, and after I have pressed the water out of the rubber grind and work it like new rubber, either immediately or at any time thereafter, as may be convenient. It is to be remarked that the degree of heat to be applied partly depends upon the size of the pieces of rubber submitted to the action of heat, and that heat may be applied and created in different ways. For instance, by heating the cylinders, or even by a constant friction, or having the rubber perseveringly ground, or many other ways. So I obtained some good results by having the cylinders heated to about 150° Fahrenheit and closer set and the rubber finely ground and worked with perseverance between the cylinders; but the best results I obtained by the process above described. After the rubber has become elastic or sticky by the application of heat the cylinders should, to prevent adhesion, be kept cold, which may easily be done by the application of water or vinegar whenever the rubber shows a tendency to adhere, and the place of cold water for the purpose of removing the stickiness and protecting against burning, as above described, may be supplied by vinegar or any other cold or cooling fluid by exposure to cold air and the like. The word "rubber" whenever used in the above-described process is intended to mean waste vulcanized rubber.

Having thus described my improved process, what I claim as my invention, and wish to secure by Letters Patent, is—

The application of heat from 150° to 600° Fahrenheit to waste vulcanized rubber, with or without immersing it in cold water or any other cooling-fluid, as hereinabove specified, for the purpose of restoring the same, so that it may be used again in the manufacture of india-rubber goods and substances, hereby expressly disclaiming all and every right to the application of artificial heat to new rubber, vulcanized or not vulcanized, and to the application of heat to rubber in any manner and for any purpose except as above set forth.

FRANCIS BASCHNAGEL.

Witnesses:
AARON FRANK,
JOHN I. BAKER.